United States Patent
Urban et al.

(10) Patent No.: US 9,231,696 B2
(45) Date of Patent: Jan. 5, 2016

(54) METHODS AND APPARATUSES FOR SUPERVISION OF OPTICAL NETWORKS

(75) Inventors: Patryk Urban, Vallingby (SE); Gemma Vall-Llosera, Jarfalla (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 73 days.

(21) Appl. No.: 14/240,495

(22) PCT Filed: Aug. 24, 2011

(86) PCT No.: PCT/SE2011/051019
§ 371 (c)(1),
(2), (4) Date: Feb. 24, 2014

(87) PCT Pub. No.: WO2013/028110
PCT Pub. Date: Feb. 28, 2013

(65) Prior Publication Data
US 2014/0212130 A1  Jul. 31, 2014

(51) Int. Cl.
*H04B 10/70* (2013.01)
*H04J 14/02* (2006.01)
*H04B 10/071* (2013.01)
*G01M 11/00* (2006.01)
*H04B 10/077* (2013.01)

(52) U.S. Cl.
CPC ......... *H04B 10/071* (2013.01); *G01M 11/3127* (2013.01); *G01M 11/3136* (2013.01); *H04B 10/0771* (2013.01); *H04J 14/0238* (2013.01); *H04J 14/0242* (2013.01); *H04J 14/0275* (2013.01); *H04J 14/0282* (2013.01)

(58) Field of Classification Search
None
See application file for complete search history.

(56) References Cited

U.S. PATENT DOCUMENTS

| 2006/0110161 A1 | 5/2006 | Cho et al. |
| 2006/0222364 A1 | 10/2006 | Chung et al. |
| 2008/0062408 A1 | 3/2008 | Lai et al. |

(Continued)

FOREIGN PATENT DOCUMENTS

| EP | 2337240 | 6/2011 |
| WO | WO-2007/029962 | 3/2007 |
| WO | WO-2010/126427 | 11/2010 |

(Continued)

OTHER PUBLICATIONS

PCT International Search Report and the Written Opinion of the International Searching Authority for PCT Counterpart Application No. PCT/SE2011/051019, (May 10, 2012), 10 pages.

(Continued)

*Primary Examiner* — Darren E Wolf
(74) *Attorney, Agent, or Firm* — Nicholson De Vos Webster & Elliott LLP

(57) ABSTRACT

Methods and apparatuses for enabling supervision of fibers in an optical communication network, where a Central Office provides data signals to a Remote Node for distribution to Optical Network Terminals (ONTs). The Central Office generates and sends test signals of different monitoring wavelengths associated to predefined groups of said ONTs, to the Remote Node. The Remote Node routes each test signal to a corresponding associated group of ONTs according to the wavelength of the test signal. When receiving a back-scattered and back-reflected test signal caused by a faulty optical fiber, the Central Office is able to identify the faulty optical fiber based on the wavelength of the back-scattered and back-reflected signal.

18 Claims, 5 Drawing Sheets

(56) References Cited

U.S. PATENT DOCUMENTS

2008/0291431 A1 11/2008 Wang et al.
2009/0263123 A1 10/2009 Zhu et al.

FOREIGN PATENT DOCUMENTS

| WO | WO-2011/086400 | 7/2011 |
|----|----------------|--------|
| WO | WO-2012/087205 | 6/2012 |
| WO | WO-2012/128677 | 9/2012 |
| WO | WO-2012/169946 | 12/2012 |
| WO | WO-2013/006100 | 1/2013 |
| WO | WO-2013/028108 | 2/2013 |

OTHER PUBLICATIONS

PCT Written Opinion of the International Preliminary Examining Authority (PCT Rule 66) for PCT Counterpart Application No. PCT/SE2011/051019, (Sep. 6, 2013), 4 pages.

PCT International Preliminary Report on Patentability (Chapter II of the Patent Cooperation Treaty) for PCT Counterpart Application No. PCT/SE2011/051019, (Nov. 18, 2013), 15 pages.

"Optical fibre cable maintenance criteria for in-service fibre testing in access networks", *ITUT L.66, Series L: Construction, Installation and Protection of Cables and Other Elements of Outside Plant*, (May 2007), 20 pages.

"Optical fibre maintenance criteria for access networks", *ITUT L.53, Series L: Construction, Installation and Protection of Cables and Other Elements of Outside Plant*, (May 2003), 28 pages.

"Optical fibre outside plant maintenance support, monitoring and testing system", *ITUT L.40, Series L: Construction, Installation and Protection of Cables and Other Elements of Outside Plant*, (Oct. 2000), 42 pages.

Kamei, Shin, et al., "N x N Cyclic-Frequency Router With Improved Performance Based on Arrayed-Waveguide Grating", *2009 IEEE, Journal of Lightwave Technology*, vol. 27, No. 18, (Sep. 15, 2009), pp. 4097-4104.

Yuksel, Kivilcim, et al., "Optical Layer Monitoring in Passive Optical Networks (PONs): A review," *Transparent Optical Networks, ICTON 2008. 10th Anniversary International Conference, IEEE*, (Jun. 22, 2008), pp. 92-98.

METHODS AND APPARATUSES FOR SUPERVISION OF OPTICAL NETWORKS

CROSS-REFERENCE TO RELATED APPLICATIONS

This application is a National stage of International Application No. PCT/SE2011/051019, filed Aug. 24, 2011, which is hereby incorporated by reference.

TECHNICAL FIELD

The present disclosure relates generally to methods and apparatuses for enabling supervision of optical fibres in an optical communication network such as a Passive Optical Network, PON.

BACKGROUND

A Passive Optical Network, PON, is a point-to-multipoint network architecture employing fibre cables from a central office to end-user premises. A PON can employ unpowered optical components such as splitters to enable a single optical fibre to serve multiple premises. A PON typically comprises an Optical Line Terminal, OLT, at the central office of the service provider and a remote node connecting a plurality of Optical Network Terminals, ONTs, which can be controlled and operated by end-users. A PON configuration reduces the amount of fibre and central office equipment required, as compared to point-to-point architectures. A passive optical network can be regarded as a form of fibre-optic access network.

FIG. 1 illustrates an example of a basic optical communication network, according to the prior art. In this example, a central office 100 comprises an OLT 100a which sends data signals on an optical feeder link 102 to a remote node 104 connecting a plurality of ONTs 106 by means of individual fibre links 108. A signal distributor 104a in remote node 104 receives the data signals on the feeder link 102 and sends each signal to a corresponding ONT 106 depending on the signal's wavelength. A component called "Arrayed Waveline Grating, AWG" may be used as signal distributor 104a in the Remote Node 104 for distributing the incoming data signals with different wavelengths over the different fibre links 108. Briefly described, the AWG is configured to route an optical signal received on an input port to a specific output port depending on the wavelength of the signal, which is a well-known technique in the art. Signals can also be transmitted over said links in the opposite direction, e.g. for signaling and data communication.

The optical feeder link 102 between central office 100 and remote node 104 in such networks is typically a single optical fibre used for transporting data signals of different dedicated wavelengths assigned to different ONTs. The feeder link 102 may be quite long, e.g. in the range of several kilometers, while the individual fibre links 108 connecting the ONTs 106 to the remote node 104 are typically shorter, typically less than one kilometer. An optical fibre in any of the links 102, 108 may be damaged at some point, for whatever reason, such that the faulty fibre causes a disturbance or break in the signal transmission. It is then naturally of interest to detect and find such a faulty fibre in order to repair the link accordingly with a minimum of impact to the network performance.

In order to supervise and monitor the performance of an optical network, Optical Time-Domain Reflectometry, OTDR, is typically used which is well-known in the field. Briefly described, an OTDR device at a central office injects a series of optical test pulses into the feeder fibre. The series of optical pulses, also called OTDR signal, travel through various network links towards the ONTs. Parts of the OTDR signals are reflected back towards the OTDR device. The back-reflected, or back-scattered, OTDR signal may be used for estimating the fibre's length and overall attenuation, including splitter losses.

A back-scattered and back-reflected OTDR signal may also be used to locate faults in fibres, such as breaks or bends, and to measure optical return loss. According to common language in this context, a "back-scattered" signal basically originates from any reflections along a fibre caused by a phenomena called Rayleigh Backscattering, whereas a "back-reflected" signal originates from a discrete event such as a fault in the fibre. In this description, the phrase "back-scattered and back-reflected" is thus used for signals caused by a faulty fibre. The above use of test signals can be initiated either at preset intervals or upon demand such as when an alarm function or the like is triggered by malfunction of the data transmission.

Generally, some requirements can be made on the performance of a monitoring or supervision system. The monitoring process should not influence regular data communication, i.e. it should be "non-invasive". This is achievable by using a dedicated optical bandwidth for the test signals which is separate from the bandwidth used for data signals. Further, the technique should be sensitive to relatively low power fluctuations detectable in on-demand or periodic modes. Still further, the network supervision should not require any high initial investment. This mainly yields that no additional monitoring functionality should be needed on the ONT side, and a common monitoring functionality should be shared over a complete optical communication network or a group of networks.

However, the known solutions of today for network supervision or monitoring are generally deemed not to fulfill the above requirements. For example, most of the existing solutions significantly increase capital expenditures because they require either a customised OTDR device, which is expensive, wavelength specific components in the fibre links (drop links) towards the ONTs, causing power budget losses, advanced OLT transmitter upgrades, e.g. light path doubling, and so forth. Further, the existing solutions are often only capable of detecting a fault in a fibre link which introduces a significant loss of more than 5 dB, which is far above an expected and wanted threshold of typically 1 dB. Significant amounts of dedicated bandwidth is also required for the test signals to accomplish accurate supervision, which may not always be available e.g. when a great number of ONTs are connected to the network all using individual wavelengths for data signals.

SUMMARY

It is an object of the invention to address at least some of the problems and issues outlined above. It is possible to achieve these objects and others by using methods and apparatuses as defined in the attached independent claims.

According to one aspect, a method for enabling supervision of optical fibres in an optical communication network is provided in a Central Office that provides data signals over a feeder fibre to Optical Network Terminals, ONTs, in the optical communication network. The data signals are distributed to the ONTs by a Remote Node connected to the Central Office. In this method, test signals of different monitoring wavelengths associated to predefined groups of the ONTs, are created. The created test signals are further sent to the Remote Node, such that the Remote Node is enabled to route the test signals to corresponding associated groups of ONTs according to the wavelengths of the test signals. A received back-scattered and back-reflected test signal caused by a faulty optical fibre can then be used for identifying the faulty optical fibre based on the wavelength of the back-scattered and back-reflected signal.

According to another aspect, a Central Office is configured to provide data signals over a feeder fibre to Optical Network Terminals, ONTs, in an optical communication network, the data signals being distributed to the ONTs by a Remote Node connected to the Central Office. The Central Office is configured to enable supervision of optical fibres in the optical communication network and comprises an Optical Line Terminal, OLT, adapted to send the data signals to the ONTs via the Remote Node. The Central Office also comprises a testing unit adapted to create test signals of different monitoring wavelengths associated to predefined groups of the ONTs, and to send the created test signals to the Remote Node. Thereby, the Remote Node is enabled to route each of the test signals to a corresponding associated group of ONTs based on the wavelengths of the test signals, such that a received back-scattered and back-reflected test signal caused by a faulty optical fibre is used for identifying the faulty optical fibre based on the wavelength of the back-scattered and back-reflected signal.

The above method and Central Office may be configured and implemented according to different optional embodiments. In one possible embodiment, the test signals are created by generating pulses by an Optical Time-Domain Reflectometry, OTDR, unit, and converting the pulses to respective monitoring wavelengths by an External Wavelength Adaption Module, EWAM.

In another possible embodiment, the monitoring wavelengths include a first component being an integer multiple of a separation parameter configured in the Remote Node for routing the test signals to the groups of ONTs, which can provide for accurate routing of signals in the Remote Node and enables effective use of the available spectrum. The monitoring wavelengths may also be tied to its associated groups of ONTs by further including a second component being the wavelength of data signals provided to one of the ONTs in each associated groups of ONTs.

The generated test signals may be sent to the Remote Node one by one according to a preset testing scheme. Further, the generated test signals may be sent to the Remote Node over the feeder fibre used for conveying the data signals from the Central Office to the Remote Node, or over a dedicated monitoring fibre separate from the feeder fibre. The Central Office may also provide measurement data of any received back-scattered and back-reflected test signals, e.g. in terms of timing and signal strength, to a Fibre Plant Manager for processing and analysis.

According to another aspect, a method for enabling supervision of optical fibres in an optical communication network is provided in a Remote Node connected to a Central Office that provides data signals over a feeder fibre via the Remote Node to ONTs, the data signals being distributed to the ONTs by the Remote Node. In this method, the Remote Node receives test signals of different monitoring wavelengths associated to predefined groups of the ONTs from the Central Office. Each of the received test signals is routed to a corresponding associated group of ONTs according to the wavelengths of the test signals. Thereby, the Central Office is enabled to identify a faulty optical fibre based on the wavelength of a received back-scattered and back-reflected test signal caused by the faulty optical fibre.

According to another aspect, a Remote Node is provided which is connected to a Central Office that provides data signals over a feeder fibre via the Remote Node to ONTs in an optical communication network. The Remote Node is configured to distribute the data signals to the ONTs and to enable supervision of optical fibres in the optical communication network. The Remote Node comprises a receiving unit adapted to receive test signals of different monitoring wavelengths associated to predefined groups of the ONTs from the Central Office. The Remote Node also comprises a routing unit adapted to route each of the received test signals to a corresponding associated group of ONTs according to the wavelengths of the test signals, such that the Central Office is enabled to identify a faulty optical fibre based on the wavelength of a received back-scattered and back-reflected test signal caused by the faulty optical fibre.

The above method and Remote Node may be configured and implemented according to different optional embodiments as well. In one possible embodiment, the received test signals are routed in the Remote Node by means of an Arrayed Waveline Grating, AWG, which receives each test signal on at least one input port and sends that test signal on a plurality of output ports to a corresponding group of ONTs to which the test signal's wavelength is associated.

In another possible embodiment, an integer multiple of a separation parameter is configured in the Remote Node for routing the test signals to the groups of ONTs, wherein the integer multiple of the separation parameter is included as a first component in the monitoring wavelengths. Further, the test signals may be received from the Central Office over the feeder fibre being used for conveying data signals, or over a dedicated monitoring fibre separate from the feeder fibre.

In another possible embodiment, if the above AWG is used for routing, the test signals are received in a power splitter and then injected from the power splitter to plural input ports on the AWG. If the test signals are received from the Central Office over a dedicated monitoring fibre, the test signals may be injected to the feeder fibre in a direction towards the Central Office by means of filters connected to the monitoring fibre and the feeder fibre. Thereby, the feeder fibre can be tested as well Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
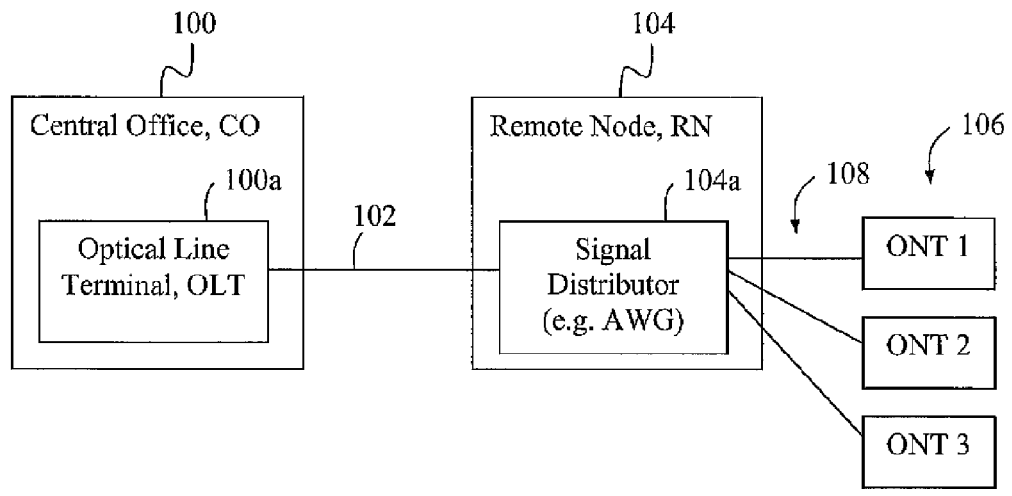
FIG. 1 is a block diagram illustrating a basic optical communication network, according to the prior art.

Briefly described, a solution is provided to make supervision of optical fibres in the optical communication network more efficient and accurate, as compared to conventional solutions. This can be achieved by sending specific test signals of different monitoring wavelengths from a central office to a remote node connecting a plurality of ONTs operated and/or owned by end-users. These monitoring wavelengths are associated to a limited set of predefined groups of the ONTs in a manner which can have been determined in beforehand. The monitoring wavelengths may have been allocated exclusively for test signals, and the term "monitoring wavelengths" is basically used here in distinction from the data wavelengths which are used for communicating data such as encoded media, signaling and messages. The test signals are thus used for monitoring and measuring performance of fibres in the optical communication network.

In this solution, the remote node routes each test signal to a respective associated group of ONTs according to the wavelength of that test signal, e.g. using the above-mentioned AWG component which can be configured for routing the test signals to different output ports connecting the different groups of ONTs, to be described in more detail further below. If one optical fibre is faulty, the test signal will be back-scattered and back-reflected by the faulty optical fibre, typically at a point in the fibre where the damage is located. The back-scattered and back-reflected test signal is then received in the central office and can be used for identifying the faulty optical fibre based on the wavelength of the back-scattered and back-reflected signal by investigating just the limited group of ONTs associated with the received signal's wavelength.

An example of how this solution can be used in practice will now be described with reference to the block diagram in FIG. 2. A central office 200 comprises an Optical Line Terminal, OLT 200a adapted to send data signals over a feeder fibre 202a to a remote node 204 for further routing to a plurality of ONTs 206, of which only a few are shown here, over individual fibres 208 installed near the end-users. The sending and routing of data signals can be carried out in the manner described above, i.e. depending on their wavelengths such that each ONT will receive its dedicated data signals only. Although this example involves just the one feeder fibre 202a for data signals, it is possible to employ this solution with any number of feeder fibres for transmission of data signals.

In this solution, the ONTs 206 have been divided into predefined groups, each group thus comprising a number of selected ONTs. A specific monitoring wavelength has also been assigned to each ONT group such that a limited set of different monitoring wavelengths, to be used for carrying test signals, are associated to different ONT groups. For example, four groups with eight ONTs per group may have been defined and four corresponding monitoring wavelengths may have been assigned to the four groups, although it is possible to define any number of ONT groups each having any number of ONTs. It is however an advantage of this solution that only a small number of monitoring wavelengths are required for testing fibres to a considerably greater number of ONTs.

The central office 200 further comprises a testing unit 200b adapted to create test signals of the monitoring wavelengths associated to the predefined groups of the ONTs 206, and to send the created test signals to the remote node 204 for distribution to respective groups according to their wavelengths. Thereby, the ONT fibres 208 can be tested remotely to see if there are any faults. In practice, the test signals may be created as follows. The testing unit 200b in this example contains a component or unit 200c called "Optical Time-Domain Reflectometry, OTDR", that generates pulses and another component or unit 200d called "External Wavelength Adaption Module, EWAM", that converts the generated pulses to respective monitoring wavelengths, thus forming the test signals. The OTDR and EWAM units as such are well-known components in the art and they are not necessary to describe in detail to understand this solution.

The created test signals are further sent out from the testing unit 200b towards the remote node 204, in this example on a dedicated monitoring fibre 202b which is separate from the feeder fibre 202a and connected to the output of the EWAM 200d in testing unit 200b. It is also possible to send out the test signals on the feeder fibre, which will be described in more detail later below with reference to another example shown in FIG. 3.

The remote node 204 comprises a receiving unit 204c, in the form of a power splitter in this example, that is adapted to receive the test signals from the Central Office 200. The remote node 204 also comprises a routing unit 204a, in the form of an AWG in this example, that is adapted to route each of the received test signals to a corresponding associated group of ONTs according to the wavelengths of the test signals. As mentioned above, the previously known AWG component can be configured to route incoming signals of specific wavelengths to specific output ports depending on said wavelengths, and this feature can be utilised here for routing each wavelength to a correct group of ONTs.

In more detail, the power splitter 204c receives the test signals with all the used monitoring wavelengths on the monitoring fibre 202b and splits these signals into equal multiple branches which are injected to different input ports on the AWG 204a. One of the branches from power splitter 204c is coupled to a filter 204e that is also coupled to the incoming feeder fibre 202a. The filter 204e is configured to allow the data signals from feeder fibre 202a to pass through to an input fibre 204b of the AWG 204a coupled to an input port, e.g. "port 1", and also to allow test signals from the branch from power splitter 204c to be injected on the input fibre 204b as well, as indicated by a dashed arrow.

Thus, each branch from power splitter 204c is connected to a specific input port on the AWG 204a and the uppermost AWG input port in this example receives both the data signals from feeder fibre 202a and the test signals from power splitter 204c, while the remaining input ports, e.g. "ports 2-8", receive only the test signals from power splitter 204c. It should be noted that in this way, all AWG input ports, e.g. ports 1-8 and using a 1:8 power splitter, will receive the same test signals regardless of wavelengths.

The AWG 204a will now route the incoming data signals of different wavelengths received on one AWG input port, e.g. port 1, to respective ONTs depending on the wavelengths of the data signals. The AWG 204a will also route the incoming test signals of different wavelengths received on all the above input ports to respective associated groups of ONTs likewise depending on the signal wavelengths. An example of how an AWG can route signals of different wavelengths in a remote node will be described in more detail later below with reference to FIG. 9.

If one of the fibres 208 has been damaged and is faulty, the test signal will be back-scattered and back-reflected by the faulty fibre and received by the test unit 200b in the central office. The faulty optical fibre can then be identified based on the wavelength of the back-scattered and back-reflected signal, by determining which group of ONTs is associated with the back-scattered and back-reflected test signal's wavelength.

The testing unit 200b is thus also configured to detect any back-scattered and back-reflected OTDR signals caused by faults in the fibres, such as breaks and bends. The testing unit 200b is further configured to measure various characteristics of the back-scattered and back-reflected OTDR signals, e.g. in terms of timing and received signal strength. The testing unit 200b may provide such measurement data to a so-called "Fibre Plant Manager, FPM" 210 for further processing and analysis, which is rather outside the scope of this disclosure.

Figure 2:
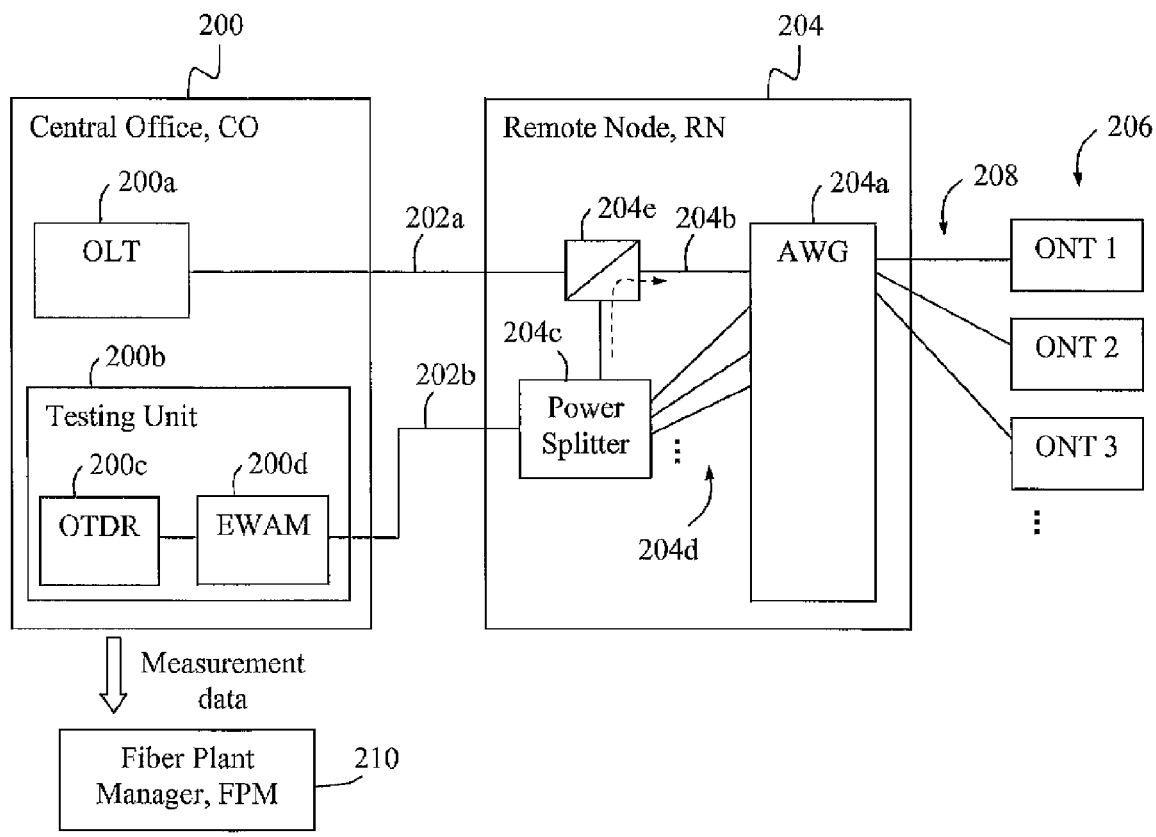
FIG. 2 is a block diagram illustrating an exemplifying arrangement for supervision of optical fibres in an optical communication network, according to some possible embodiments.
Figure 2A:
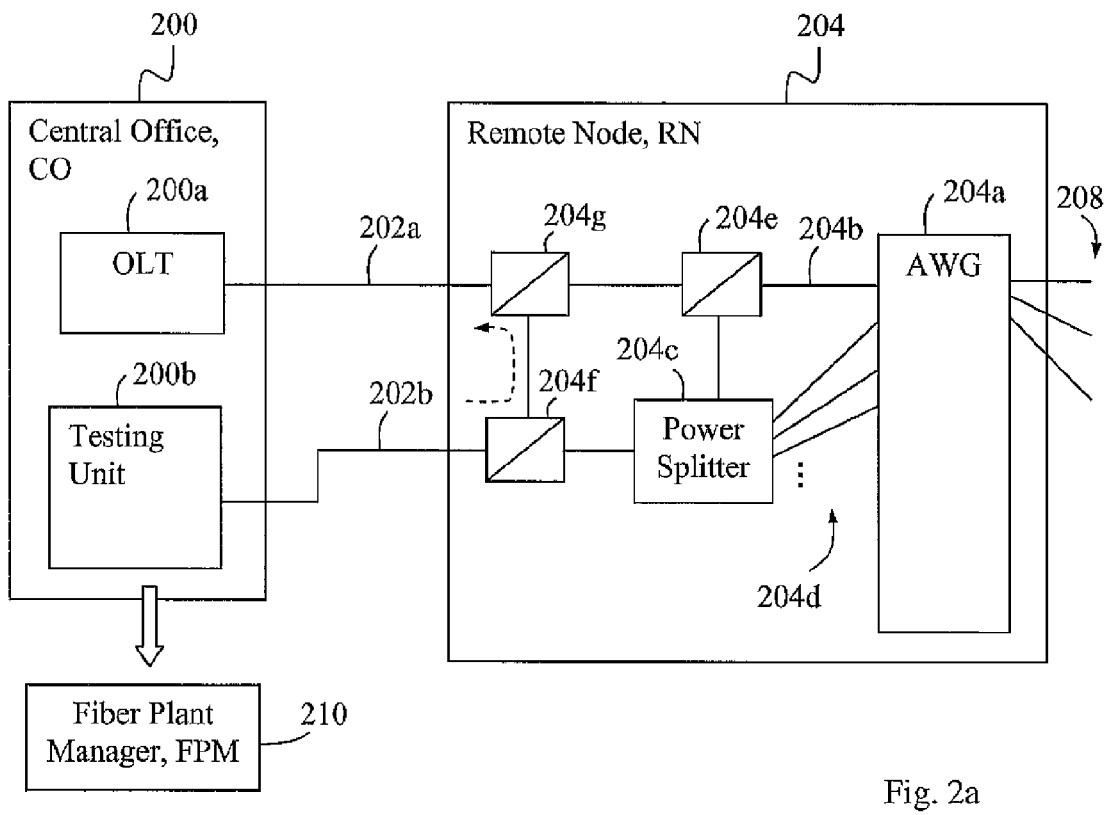
FIG. 2a is a block diagram illustrating a possible modification of the arrangement in FIG. 2.

FIG. 2a illustrates a somewhat modified version of the arrangement in FIG. 2, which enables testing of the feeder fibre 202a as well, in addition to testing the ONT fibres 208. In FIG. 2a, the test signals received from the central office 200 over the dedicated monitoring fibre 202b are injected to the feeder fibre 202a in a direction towards the central office 200 by means of filters 204f and 204g connected to the monitoring fibre 202b and the feeder fibre 202a, respectively.

In more detail, a first filter 204f coupled to the incoming monitoring fibre 202b is configured to allow the test signals to pass through towards the power splitter 204c and also injecting the test signals of one of the monitoring wavelengths to a second filter 204g coupled to the feeder fibre 202a. The filter 204g is configured to allow the data signals coming from feeder fibre 202a to pass through and also to inject the test signals from filter 204f to the feeder fibre 202a, as indicated by a dashed arrow.

Figure 3:
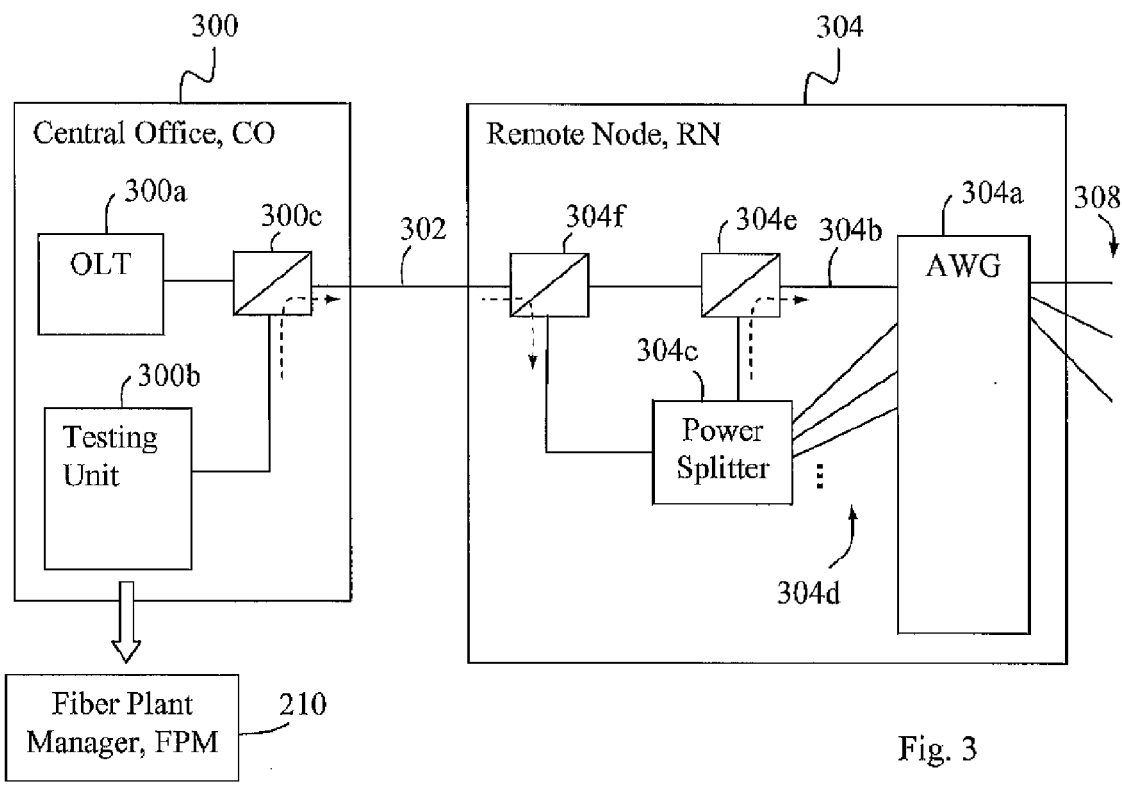
FIG. 3 is a block diagram illustrating another exemplifying arrangement for supervision of optical fibres in an optical communication network, according to further possible embodiments.

FIG. 3 illustrates another example of using this solution where a testing unit 300b in a central office 300 sends out the test signals on the feeder fibre 302 towards a remote node 304, instead of a dedicated monitoring fibre, by means of a filter 300c coupled to an OLT 300a and to the feeder fibre 302. The testing unit 300b and OLT 300a are basically equal to the testing unit 200b and OLT 200a in the previous examples. The filter 300c is thus configured to allow the data signals coming from OLT 300a to pass through and also to inject the test signals from testing unit 300b to the feeder fibre 302, as indicated by a dashed arrow in the central office 300.

At the remote node 304, the data signals and the test signals on feeder fibre 302 are received by a filter 304f configured to allow the data signal wavelengths to pass through, and also to inject the test signal wavelengths to a power splitter 304c, as indicated by a left dashed arrow in the remote node 304. The power splitter 304c is configured basically in the same manner as power splitter 204c in FIGS. 2 and 2a, i.e. to split the test signals from filter 304f into equal multiple branches which are injected to different input ports on an AWG 304a. One of the branches from power splitter 304c is likewise coupled to a filter 304e that is also coupled to the incoming feeder fibre 302 via filter 304f. The filter 304e is basically equal to the filter 304e in FIGS. 2 and 2a, i.e. configured to allow the data signals from filter 304f to pass through to an input fibre 304b of the AWG 304a, and also to allow test signals from the branch from power splitter 304c to be injected on the input fibre 304b as well, as indicated by a right dashed arrow in the remote node 304.

In this way, the AWG 304a will receive all data signals regardless of wavelength on one input port and all test signals regardless of wavelength on all input ports to which the power splitter 304c branches are connected, i.e. in the same manner as the AWG 204a in FIGS. 2 and 2a. Since the test signals will propagate over the feeder fibre 302 towards the remote node 304, any fault on the feeder fibre 302 can be detected by receiving a back-scattered and back-reflected OTDR signal caused by that fault, regardless of wavelength. In other words, all OTDR signals of all the used monitoring wavelengths will be back-scattered and back-reflected in this case, and this information can be used for identifying the faulty optical fibre.

It should be noted that both FIGS. 2a and 3 allows for testing of the feeder fibre 202a, 302, in addition to testing the individual ONT fibres 208, 308. However, the embodiment shown in FIG. 2a actually requires one more monitoring wavelength as compared to the embodiment shown in FIG. 3, since a separate monitoring wavelength must be used for the test signals injected to the feeder fibre 202a towards the central office 200a, in addition to the wavelengths used for test signals routed to the ONTs, which is not needed in FIG. 3.

Figure 4:
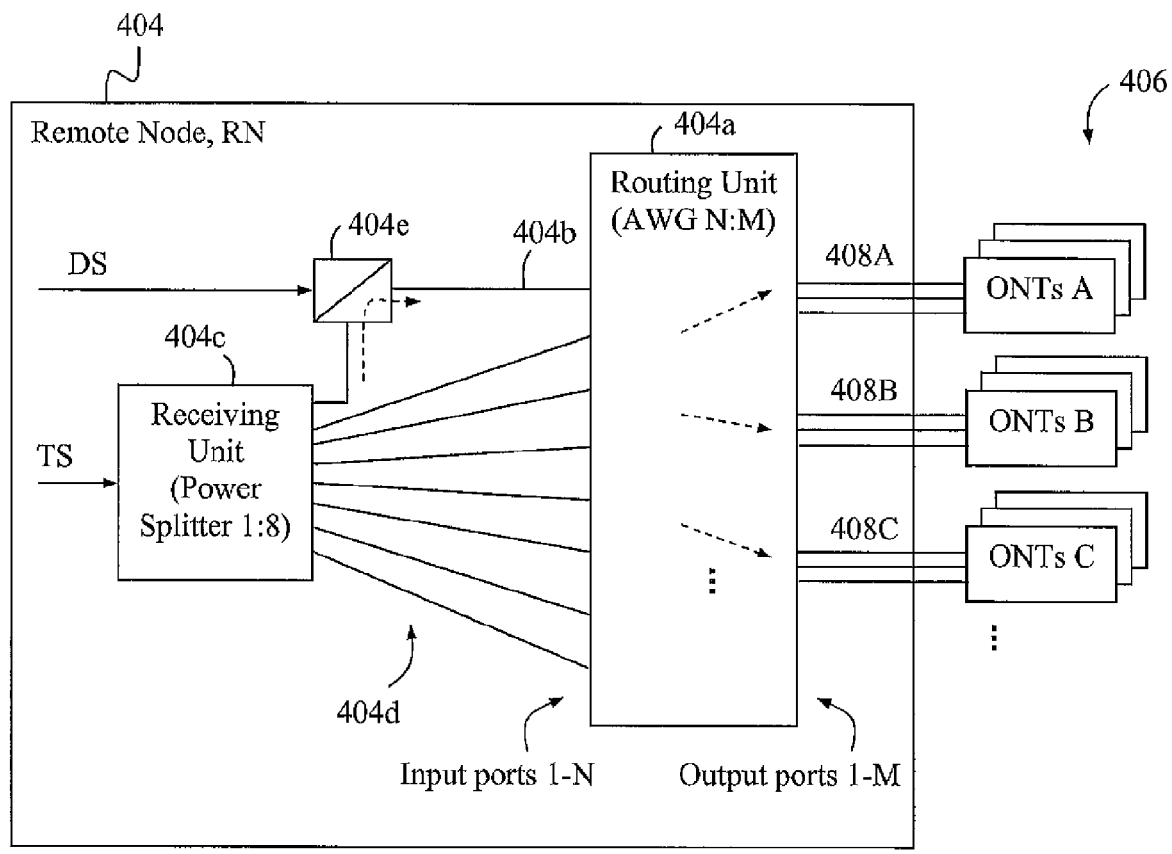
FIG. 4 is a block diagram illustrating the operation of an exemplifying Remote Node in more detail, according to further possible embodiments.

A detailed but non-limiting example of how a remote node can be configured to accomplish the above-described solution, is illustrated by the block diagram in FIG. 4. The remote node 404 is connected to a central office, not shown, that provides data signals over a feeder fibre to ONTs 406, in an optical communication network. The remote node 404 also receives test signals, e.g. one by one according to a preset testing scheme employed by a testing unit in the central office. The test signals are carried by a limited set of monitoring wavelengths.

The remote node 404 is configured to distribute the data signals to the ONTs and to enable supervision of optical fibres in the optical communication network, e.g. in the manner described above for FIGS. 2, 2a and 3. In this solution, the ONTs have been divided into predefined groups 406, indicated here as ONTs A, B, C . . . , each group thus comprising a number of selected ONTs. A specific monitoring wavelength has also been assigned to each ONT group, which has also been described above. In this figure, any arrangement of filters for injecting test signals to the feeder fibre have been omitted for simplicity, although this can also be employed in the manner shown in FIGS. 2a and 3.

The remote node 404 comprises an receiving unit 404c adapted to receive test signals "TS" of different monitoring wavelengths associated to the predefined groups of ONTs 406 from the central office. The receiving unit 404c may be a power splitter as shown in this example, such as a 1:8 power splitter i.e. having one input and 8 equal outputs. The remote node 404 also comprises a routing unit 404a adapted to route each of the received test signals to a corresponding associated group of ONTs 406 according to the wavelengths of the test signals. Thereby, the central office is enabled to identify a faulty optical fibre based on the wavelength of a received back-scattered and back-reflected test signal caused by the faulty optical fibre, basically as described above.

The routing unit 404a may be an AWG as shown in this example, such as an N:M AWG i.e. having input ports 1-N and output ports 1-M. The groups of ONTs 406 are connected to the AWG output ports by dedicated fibres such that one group of ONTs A is connected by a set of fibres 408A, another group of ONTs B is connected by another set of fibres 408B, and so forth.

The data signals DS from the feeder fibre are directed through filter 404e to a first input port 1 on the AWG 404a over an optical link 404b. The test signals TS received by power splitter 404c are transmitted on its 8 outgoing branches, one of which is coupled to the first AWG input port 1 over optical link 404b by means of filter 404e, as shown by a dashed arrow through filter 404e. The remaining 7 outgoing branches are coupled to further AWG input ports 2-8 over further optical links 404d. As indicated above, this solution can be used for a remote node comprising a receiving unit with any number of branches and a routing unit with any number of input ports and output ports, i.e. without limitation to the shown examples.

The AWG 404a in this example is configured to route data signals from AWG input port 1 to individual ONTs based on the different wavelengths of the data signals being individually assigned to the ONTs such that each ONT receives only data signals carried by its dedicated wavelength, as described above. As a result, the AWG input ports 2-8 only receive test signals TS from respective branches of the power splitter 404c, while AWG input port 1 receive the same test signals TS in addition to the data signals DS. The AWG 404a is configured to route test signals with a first monitoring wavelength associated to ONT group A from AWG input ports 1-8 to the AWG output ports connecting fibres 408A of the ONT group A, as indicated by a first dashed arrow in unit 404a. Further, the AWG 404a is configured to route test signals with a second monitoring wavelength associated to ONT group B from AWG input ports 1-8 to the AWG output ports connecting fibres 408B of the ONT group B, as indicated by a second dashed arrow in unit 404a, and so forth. Another even more detailed example of routing data signals and test signals in an AWG depending on their wavelengths, will be described later below with reference to FIG. 9.

As described above, the routing unit 404a may be further adapted to route the received test signals by means of an AWG which receives each test signal on at least one input port and sends that test signal on a plurality of output ports to a corresponding group of ONTs to which the test signal's wavelength is associated. Further, the receiving unit 404c may be further adapted to receive the test signals from the central office over the feeder fibre being used for conveying the data signals, or over a dedicated monitoring fibre separate from the feeder fibre.

It should be noted that FIGS. 2-4 merely illustrates various functional units in the central office and the remote node in a logical sense, although the skilled person is able to implement these functions in practice using suitable software and hardware means. Thus, this aspect of the solution is generally not limited to the shown structures of the central office and the remote node, while their functional units such as 200a, b and 404a, c may be configured to operate according to the features described for any of FIGS. 2-4 above and FIGS. 5-9 below, where appropriate.

The functional units described above can be implemented in the central office and the remote node, respectively, as program modules of a respective computer program comprising code means which, when run by a processor "P" in each of the central office and the remote node causes them to perform the above-described actions. Each processor P may be a single Central Processing Unit (CPU), or could comprise two or more processing units. For example, the processor P may include general purpose microprocessors, instruction set processors and/or related chips sets and/or special purpose microprocessors such as Application Specific Integrated Circuits (ASICs). The processor P may also comprise a storage for caching purposes.

Each computer program may be carried by a computer program product in either of the central office and the remote node, respectively, in the form of a memory "M" connected to each processor P. The computer program product or memory M comprises a computer readable medium on which the computer program is stored. For example, the memory M may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the central office and the remote node.

Figure 5:
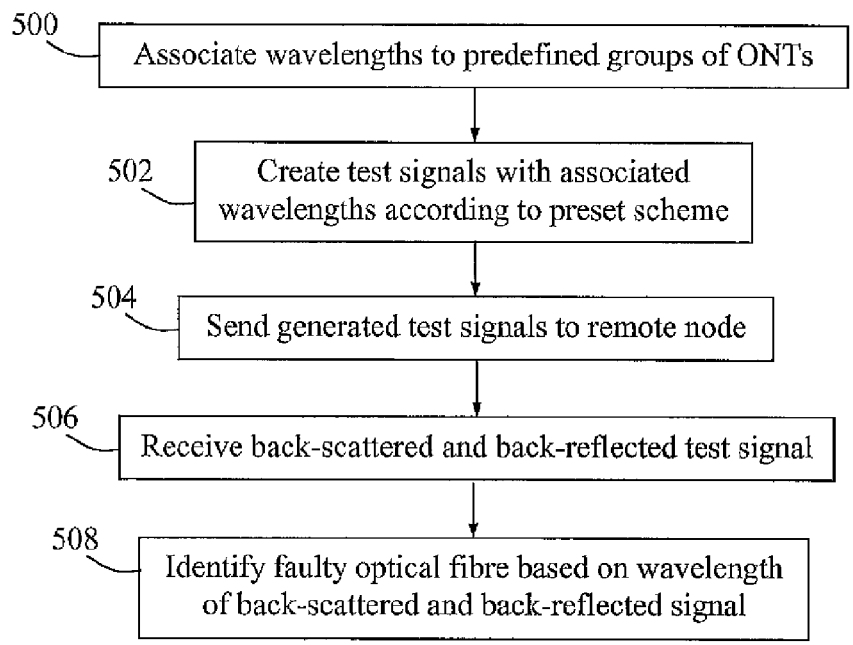
FIG. 5 is a flow chart illustrating a procedure performed at a Central Office, according to further possible embodiments.

With reference to the flow chart in FIG. 5, the solution will now be described in terms of actions executed at a central office for enabling supervision of optical fibres in the optical communication network. As in the previous examples, the central office provides data signals over a feeder fibre to ONTs in the network, and the data signals are distributed to the ONTs by a remote node connected to the Central Office.

A first action 500 illustrates that a set of monitoring wavelengths are associated to predefined groups of ONTs, which may be performed in any suitable manner, e.g. manually. In a next action 502, the central office creates test signals of different monitoring wavelengths associated to the predefined ONT groups. As described above, creating the test signals may comprise generating pulses by an OTDR unit and converting the pulses to respective monitoring wavelengths by an EWAM, as illustrated by blocks 200c and 200d in FIG. 2. In a further action 504, the central office sends the created test signals to the remote node, thereby enabling the Remote Node to route the test signals to corresponding associated groups of ONTs according to the wavelengths of the test signals.

Another action 506 illustrates that the central office, at some point when testing the network, receives a back-scattered and back-reflected test signal caused by a faulty optical fibre. The back-scattered and back-reflected test signal is then used in action 508 for identifying the faulty optical fibre based on the wavelength of the back-scattered and back-reflected signal. In this action, the central office may also measure various other characteristics of the received back-scattered and back-reflected test signal, e.g. in terms of timing and received signal strength, and then provide measurement data of the received back-scattered and back-reflected test signal to a Fibre Plant Manager or the like for processing, e.g. as described for FIG. 2. For example, the time between sending out the test signal and receiving the back-scattered and back-reflected test signal, and/or the received signal strength, may further be used for determining the location and nature of the damage causing the reflection, which is however outside the scope of this disclosure.

Figure 6:
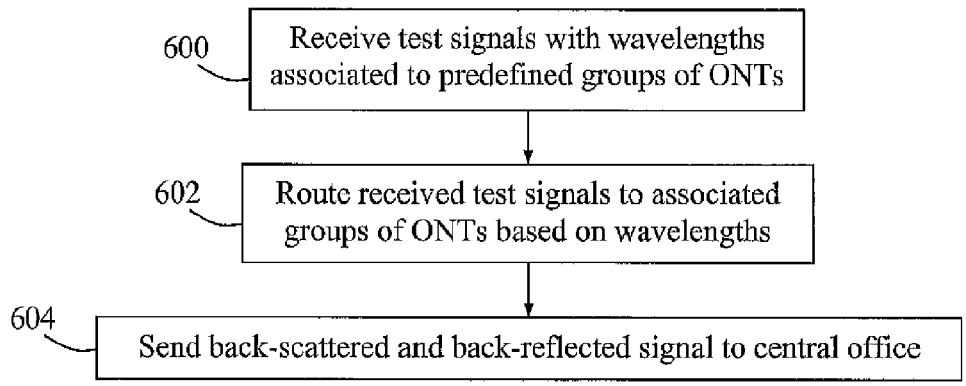
FIG. 6 is a flow chart illustrating a procedure performed at a Remote Node, according to further possible embodiments.

With reference to the flow chart in FIG. 6, the solution will now be described in terms of actions executed in a remote node connected to a central office that provides data signals over a feeder fibre to ONTs in an optical communication network, for enabling supervision of optical fibres in the optical communication network. The data signals are distributed to the ONTs by the remote node in the following.

A first action 600 illustrates that the remote node receives test signals of different monitoring wavelengths associated to predefined groups of the ONTs from the Central Office. In a further action 602, the remote node routes each of the received test signals to a corresponding associated group of ONTs according to the wavelengths of the test signals. A final action 604 in this procedure illustrates that the remote node sends a back-scattered and back-reflected test signal caused by a faulty optical fibre to the central office, thereby enabling the central office to identify the faulty optical fibre based on the wavelength of the back-scattered and back-reflected test signal sent in this action.

As shown in the previous examples, the remote node may route the received test signals by means of an AWG which receives each test signal on at least one input port and sends that test signal on a plurality of output ports to a corresponding group of ONTs to which the test signal's wavelength is associated. An example of how this can be done was described above referring to FIG. 4.

The remote node may receive the test signals from the central office either over the feeder fibre, as in FIG. 3, or over a dedicated monitoring fibre separate from the feeder fibre, as in FIGS. 2 and 2a. Further, the test signals may be received in a power splitter in the remote node and may then be injected from the power splitter to plural input ports on the AWG, e.g. as shown in FIGS. 2-4. If the test signals are received from the central office over a dedicated monitoring fibre, the test signals may be injected to the feeder fibre in a direction towards the central office by means of filters connected to the monitoring fibre and the feeder fibre, respectively, e.g. the filters 204f and 204g shown in FIG. 2a.

The division of ONTs into groups and selection of monitoring wavelengths may be made in any manner depending on the implementation. For example, the monitoring wavelengths may include a first component being an integer multiple "n" of a separation parameter which can be referred to as "Free Spectral Range, FSR". The first component of the monitoring wavelengths is thus nFSR where n can be any of 1, 2, 3, . . . . The FSR may further be configured in the remote node for routing the test signals to the groups of ONTs based on the wavelengths of the test signals. The monitoring wavelengths can also be tied to its associated groups of ONTs by further including a second component being the wavelength of data signals provided to one of the ONTs in each associated groups of ONTs, e.g. the first wavelength used by an ONT in the group.

Figure 7:
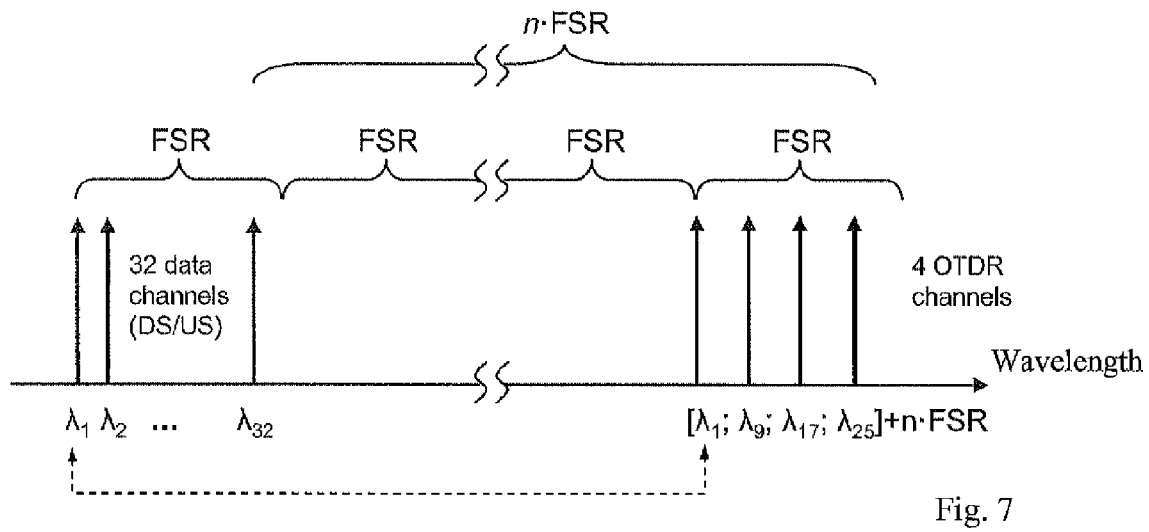
FIG. 7 is a first wavelength diagram illustrating usage of wavelengths for data and monitoring when bidirectional transmission is employed, according to further possible embodiments.
Figure 8:
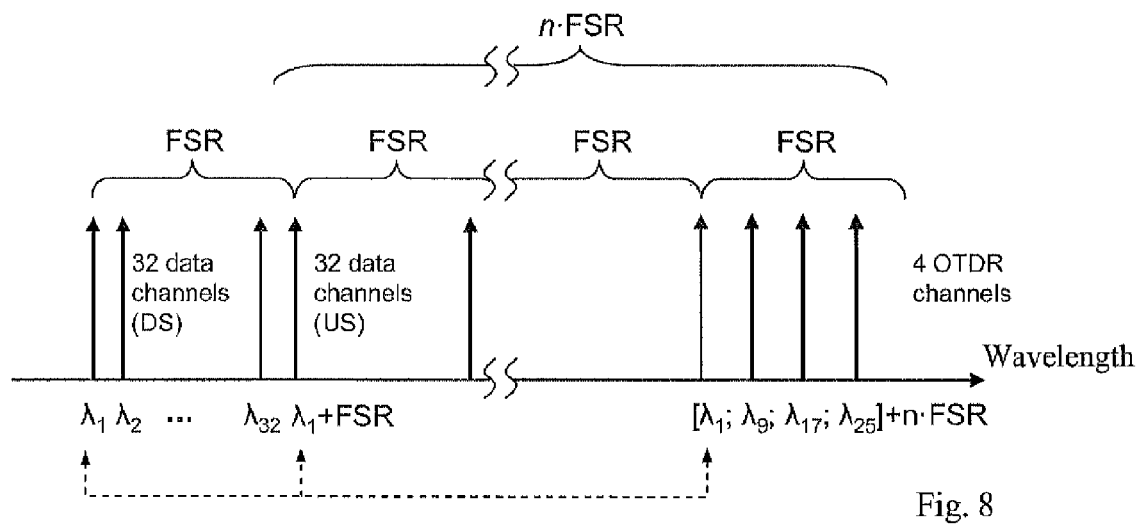
FIG. 8 is a second wavelength diagram illustrating usage of wavelengths for data and monitoring when unidirectional transmission is employed, according to further possible embodiments.

FIG. 7 illustrates how monitoring wavelengths can be selected in a wavelength spectrum to be associated to different groups of ONTs in the case when bidirectional transmission is employed, i.e. when the same wavelength is used for data signals in both directions between the central office and the ONTs, i.e. "downstreams, DS" and "upstreams, US", respectively. FIG. 8 further illustrates how monitoring wavelengths can be selected in a wavelength spectrum in the case when unidirectional transmission is employed, i.e. when two different wavelengths are required for transmission in opposite directions DS and US for data signals between the central office and the ONTs. In both examples, the FSR is used as a basis for the above-mentioned first component of the monitoring wavelengths.

In FIG. 7, a range of 32 wavelengths $\lambda_1$ to $\lambda_{32}$ in the left side of the shown spectrum are used as channels for transmitting data to and from respective ONTs, and the separation parameter FSR is defined to encompass this range of wavelengths for data channels. Four ONT groups can be predefined using channel wavelengths $\lambda_1$-$\lambda_8$, $\lambda_9$-$\lambda_{16}$, $\lambda_{17}$-$\lambda_{24}$, and $\lambda_{25}$-$\lambda_{32}$, respectively, for data signals.

In the right side of the shown spectrum, 4 OTDR channel wavelengths are selected as monitoring wavelengths for these four ONT groups, comprised of the first component nFSR and the second component being the wavelength of data signals of the first ONT in each group, i.e. $\lambda_1$+nFSR, $\lambda_9$+nFSR, $\lambda_{17}$+nFSR, and $\lambda_{25}$+nFSR, as shown in the figure. A dashed two-way arrow indicates that the monitoring wavelength $\lambda_1$+nFSR of the first ONT group is tied to the data channel wavelength $\lambda_1$ used for the first ONT in that group, where further monitoring wavelengths are likewise tied to data channel wavelengths $\lambda_9$, $\lambda_{17}$ and $\lambda_{25}$ used for the first ONT in respective groups. However, the monitoring wavelength may be tied to the data channel wavelength used for any of the ONTs in the group, such as the second or third or fourth ONT in the group, etc. Using the data channel wavelength of the first ONT in respective ONT groups as described above is just an optional example used here to illustrate.

In FIG. 8, 32 wavelengths $\lambda_1$ to $\lambda_{32}$ in the left side of the shown spectrum are used as channels for transmitting data to respective ONTs, while 32 further wavelengths $\lambda_1$+FSR to $\lambda_{32}$+FSR are used as channels for transmitting data in the opposite direction from respective ONTs, i.e. employing unidirectional transmission with separate wavelength channels for DS and US transmissions. A dashed three-way arrow indicates that the monitoring wavelength $\lambda_1$+nFSR of the first ONT group is tied to the data channel wavelengths $\lambda_1$ and $\lambda_1$+FSR used for data of the first ONT in that group, and so forth.

Figure 9:
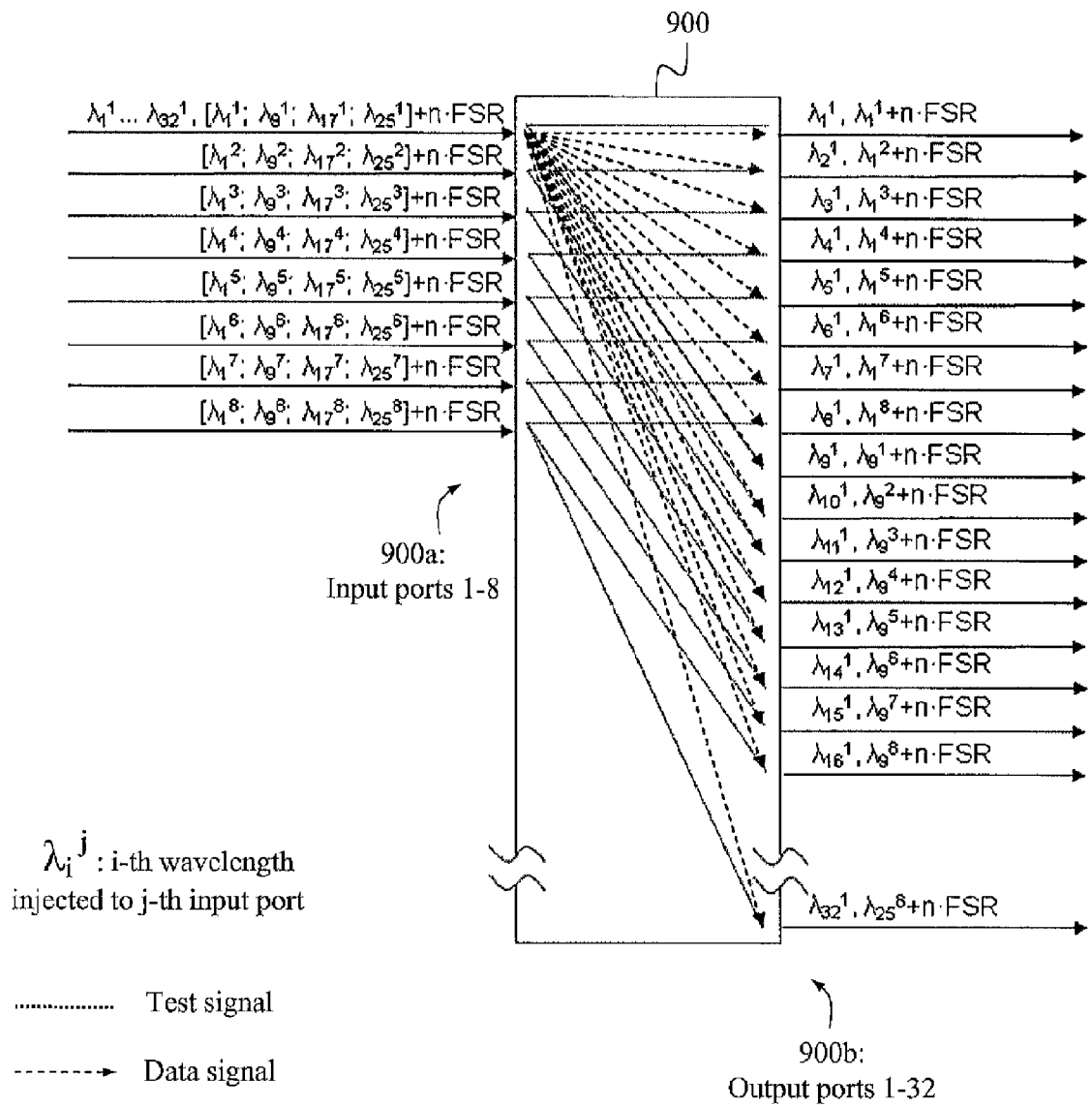
FIG. 9 is a block diagram illustrating the operation of another exemplifying Remote Node in more detail, according to further possible embodiments.

A more detailed example of routing different wavelengths for data signals and test signals in a remote note using this solution, is illustrated in FIG. 9 where four monitoring wavelengths have been selected respectively for four ONT groups in the manner shown in FIG. 7. A routing unit 900 of the remote note, such as an AWG, has 8 input ports 900a and 32 output ports 900b, the latter being connected to 32 ONTs by individual fibre cables. Thus, channel wavelengths $\lambda_1$-$\lambda_{32}$ are used to carry data signals and $\lambda_1$+nFSR, $\lambda_9$+nFSR, $\lambda_{17}$+nFSR, and $\lambda_{25}$+nFSR have been selected as the four monitoring wavelengths to carry test signals. In this figure, test signals are illustrated by dotted lines and data signals are illustrated by dashed arrows.

On the first input port 1 of routing unit 900, data signals of all data wavelengths $\lambda_1$-$\lambda_{32}$ as well as the test signals of the four monitoring wavelengths nFSR, $\lambda_9$+nFSR, $\lambda_{17}$+nFSR, and $\lambda_{25}$+nFSR, are received. On the remaining input ports 2-8, the same test signals of the four monitoring wavelengths are likewise received, e.g. using a power splitter as in the previous examples. In this figure, $\lambda_i^j$ generally denotes an i:th wavelength injected to a j:th input port. On the output side 900b of routing unit 900, a first group of ONTs are connected to output ports 1-8, a second group of ONTs are connected to output ports 9-16, a third group of ONTs are connected to output ports 17-24 and a fourth group of ONTs are connected to output ports 25-32.

The routing unit 900 is configured to route data signals of wavelength $\lambda_1$ to output port 1, data signals of wavelength $\lambda_2$ to output port 2, and so forth. Test signals of all four monitoring wavelengths [$\lambda_1$, $\lambda_9$, $\lambda_{17}$, $\lambda_{25}$]+nFSR are received on all input ports 1-8. The routing unit 900 is further configured to route test signals of monitoring wavelength $\lambda_1$+nFSR from input port 1 to output port 1, from input port 2 to output port 2, and so forth. In the same manner, test signals of monitoring wavelength $\lambda_9$+nFSR are routed from input port 1 to output port 9, from input port 2 to output port 10, and so forth.

In this way, routing unit 900 is thus configured to route test signals of monitoring wavelength $\lambda_1$+nFSR to all of output ports 1-8, test signals of monitoring wavelength $\lambda_9$+nFSR to all of output ports 9-16, test signals of monitoring wavelength $\lambda_{17}$+nFSR to all of output ports 17-24, and test signals of monitoring wavelength $\lambda_{25}$+nFSR to all of output ports 25-32. Thereby, the four monitoring wavelengths will be transmitted to the ONTs of its respective ONT groups.

One or more advantages may be achieved by using the above-described solution. For example, this solution enables monitoring and testing of a substantial amount of optical fibres in an optical communication network by using a relatively small number of dedicated monitoring wavelengths, which is an advantage particularly if most of the available spectrum of wavelengths is needed for carrying data signals in the network. By sending and routing different monitoring wavelengths to different groups of ONTs, good accuracy can still be achieved for identifying any faulty fibres.

A monitoring process using this solution has no impact on the regular data communication since dedicated and non-interfering monitoring wavelengths are used, i.e. separate from the data signal wavelengths. Further, the solution does not entail high initial investments since no monitoring functionality is required on the ONT side and since the monitoring functionality, when implemented in one central office and a remote node connected thereto, can be shared over a great number of ONTs attached to the remote node. However, the solution can of course be used for any number of central offices and/or remote nodes.

While the solution has been described with reference to specific exemplary embodiments, the description is generally only intended to illustrate the inventive concept and should not be taken as limiting the scope of the solution. For example, the terms "central office", "remote node", "ONT", "OLT", "OTDR", "EWAM", "AWG", "FSR", and "separation parameter" have been used throughout this description, although any other corresponding nodes, functions, and/or parameters could also be used having the features and characteristics described here. The solution is defined by the appended claims.

The invention claimed is:

1. A method in a Central Office providing data signals over a feeder fibre to Optical Network Terminals (ONTs), in an optical communication network, the data signals being distributed to the ONTs by a Remote Node communicatively coupled to the Central Office, for enabling supervision of optical fibres in the optical communication network, the method comprising:
   creating test signals of different monitoring wavelengths associated to predefined groups of said ONTs, each group comprising a plurality of ONTs; and
   sending the created test signals to the Remote Node, thereby enabling the Remote Node to route said test signals to corresponding associated groups of ONTs according to the wavelengths of the test signals, said monitoring wavelengths including a first component being an integer multiple of a separation parameter (nFSR) configured in the Remote Node for routing the test signals to said groups of ONTs, wherein a received backscattered and back-reflected test signal caused by a faulty optical fibre is used for identifying the faulty optical fibre based on the wavelength, including a combination of the first and a second component, of the back-scattered and back-reflected signal.

2. The method according to claim 1, wherein said monitoring wavelengths are tied to their associated groups of ONTs by further including the second component being the wavelength of data signals provided to one of the ONTs in each associated groups of ONTs.

3. The method according to claim 1, wherein the generated test signals are sent to the Remote Node one by one according to a preset testing scheme.

4. The method according to claim 1, wherein the generated test signals are sent to the Remote Node over said feeder fibre being used for conveying the data signals from the Central Office to the Remote Node, or over a dedicated monitoring fibre separate from the feeder fibre.

5. The method according to claim 1, wherein measurement data of the received back-scattered and back-reflected test signal is provided to a Fibre Plant Manager for processing.

6. A Central Office providing data signals over a feeder fibre to Optical Network Terminals (ONTs), in an optical communication network, the data signals being distributed to the ONTs by a Remote Node communicatively coupled to the Central Office, the Central Office being configured to enable supervision of optical fibres in the optical communication network, the Central Office comprising:
   an Optical Line Terminal (OLT) adapted to send said data signals to the ONTs via the Remote Node; and
   a testing unit adapted to create test signals of different monitoring wavelengths associated to predefined groups of said ONTs, each group comprising a plurality of ONTs, and to send the created test signals to the Remote Node, thereby enabling the Remote Node to route each of said test signals to a corresponding associated group of ONTs based on the wavelengths of the test signals, said monitoring wavelengths including a first component being an integer multiple of a separation parameter (nFSR) configured in the Remote Node for routing the test signals to said groups of ONTs, such that a received back-scattered and back-reflected test signal caused by a faulty optical fibre is used for identifying the faulty optical fibre based on the wavelength, including a combination of the first and a second component, of the back-scattered and back-reflected signal.

7. A method in a Remote Node communicatively coupled to a Central Office that provides data signals over a feeder fibre via the Remote Node to Optical Network Terminals (ONTs), in an optical communication network, the data signals being distributed to the ONTs by the Remote Node, for enabling supervision of optical fibres in the optical communication network, the method comprising:
   receiving test signals of different monitoring wavelengths associated to predefined groups of said ONTs from the Central Office, each group comprising a plurality of ONTs; and
   routing each of said received test signals to a corresponding associated group of ONTs according to the wavelengths of the test signals, said monitoring wavelengths including a first component being an integer multiple of a separation parameter (nFSR) configured in the Remote Node for routing the test signals to said groups of ONTS, thereby enabling the Central Office to identify a faulty optical fibre based on the wavelength, including a combination of the first and a second component, of a received back-scattered and back-reflected test signal caused by said faulty optical fibre.

8. The method according to claim 7, wherein an integer multiple of a separation parameter (nFSR) is configured in the Remote Node for routing the test signals to said groups of ONTs, said integer multiple being included in the monitoring wavelengths as the first component.

9. The method according to claim 7, wherein the test signals are received from the Central Office over said feeder fibre being used for conveying said data signals, or over a dedicated monitoring fibre separate from the feeder fibre.

10. The method according to claim 9, wherein the test signals are received from the Central Office over a dedicated monitoring fibre, and the test signals are injected to said feeder fibre in a direction towards the Central Office by filters communicatively coupled to the monitoring fibre and the feeder fibre.

11. A Remote Node communicatively coupled to a Central Office that provides data signals over a feeder fibre via the Remote Node to Optical Network Terminals (ONTs), in an optical communication network, the Remote Node being configured to distribute the data signals to the ONTs and to enable supervision of optical fibres in the optical communication network, the Remote Node comprising:
   a receiving unit adapted to receive test signals of different monitoring wavelengths associated to predefined groups of said ONTs from the Central Office, each group comprising a plurality of ONTs; and
   a routing unit adapted to route each of said received test signals to a corresponding associated group of ONTs according to the wavelengths of the test signals, said monitoring wavelengths including a first component being an integer multiple of a separation parameter (nFSR) configured in the Remote Node for routing the test signals to said groups of ONTs, thereby enabling the Central Office to identify a faulty optical fibre based on the wavelength, including a combination of the first and a second component, of a received back-scattered and back-reflected test signal caused by said faulty optical fibre.

12. The Remote Node according to claim 11, wherein the receiving unit is further adapted to receive the test signals from the Central Office over said feeder fibre being used for conveying said data signals, or over a dedicated monitoring fibre separate from the feeder fibre.

13. The Remote Node according to claim 12, wherein if the test signals are received from the Central Office over a dedicated monitoring fibre, the test signals are injected to said feeder fibre in a direction towards the Central Office by filters communicatively coupled to the monitoring fibre and the feeder fibre.

14. The central office according to claim 6, wherein said monitoring wavelengths are tied to their associated groups of ONTs by further including the second component being the wavelength of data signals provided to one of the ONTs in each associated groups of ONTs.

15. The central office according to claim 6, wherein the testing unit is further adapted to send the created test signals to the Remote Node one by one according to a preset testing scheme.

16. The central office according to claim 6, wherein the testing unit is further adapted to send the created test signals to the Remote Node over said feeder fibre being used for conveying the data signals from the Central Office to the Remote Node, or over a dedicated monitoring fibre separate from the feeder fibre.

17. The central office according to claim 6, wherein measurement data of the received back-scattered and back-reflected test signal is provided to a Fibre Plant Manager for processing.

18. The Remote Node according to claim 11, wherein the Remote Node is further configured to include an integer multiple of a separation parameter (nFSR) for routing the test signals to said groups of ONTs, said integer multiple being included in the monitoring wavelengths as the first component.

* * * * *

UNITED STATES PATENT AND TRADEMARK OFFICE
CERTIFICATE OF CORRECTION

PATENT NO. : 9,231,696 B2
APPLICATION NO. : 14/240495
DATED : January 5, 2016
INVENTOR(S) : Urban et al.

Page 1 of 1

It is certified that error appears in the above-identified patent and that said Letters Patent is hereby corrected as shown below:

In the specification

Column 8, Line 25, delete "office 200a," and insert -- office 200, --, therefor.

Column 12, Line 39, delete "nFSR," and insert -- $\lambda_1$+nFSR, --, therefor.

Signed and Sealed this
Second Day of August, 2016

Michelle K. Lee
*Director of the United States Patent and Trademark Office*